March 31, 1959 J. F. MORRIS 2,879,547
METHOD OF MAKING FUSED FILM LAMINATES
Filed Oct. 16, 1956 2 Sheets-Sheet 1

INVENTOR.
BY James F. Morris
Rowland V. Patrick
ATTORNEY

March 31, 1959 J. F. MORRIS 2,879,547
METHOD OF MAKING FUSED FILM LAMINATES
Filed Oct. 16, 1956 2 Sheets-Sheet 2

Fig. 7.

INVENTOR
James F. Morris
Rowland V. Patrick
ATTORNEY

United States Patent Office 2,879,547
Patented Mar. 31, 1959

2,879,547
METHOD OF MAKING FUSED FILM LAMINATES

James F. Morris, North Olmsted, Ohio, assignor to The Kendall Company, Boston, Mass., a corporation of Massachusetts Application October 16, 1956, Serial No. 616,910

19 Claims. (Cl. 18—55)

This invention relates to methods of uniting two or more thermoplastic materials into laminar flexible sheet form. In particular, the invention is concerned with such methods where high temperature and pressure are utilized in forming fused laminations. The invention is also concerned with sheet materials made by the methods of the invention.

A primary object of this invention is the production of sheet laminates having bonds of unusually high strength between adjacent laminae.

Another object of the invention is the production of self-supporting sheet laminates in a continuous process with the component materials comprising at least two contacting laminae being independently formed successively from separate plastic bulks, and with each succeeding lamina, as it is formed, being united by fusion under pressure to a preceding lamina immediately after the preceding lamina is formed.

In accordance with this invention, sheet materials are fabricated from a number of laminae, each of which is formed from an individual bulk mass or bank of molten thermoplastic film-forming material. An initial film comprising one lamina is formed from such a bulk mass or bank deposited between converging relatively moving surfaces forming a nip. One of these surfaces is a carrying surface to which the initial lamina is caused to adhere as it emerges from the nip by reason of temperature and surface speed relations as hereinafter described. The nip gap is adjusted to yield the desired thickness of lamina. The carrying surface also passes another or successive other contiguous converging surfaces forming a second or successive nips. The gap widths of these nips each successively increase by an increment such that the gap width of any one gap is equivalent to the summation of the total width of previous gaps and an amount sufficient to yield the desired thickness of the lamina to be formed at that one gap. The gap width of the last gap is, therefore, sufficent to yield the thickness of the completed laminate.

Thermoplastic film-forming materials are deposited in the successive nips so that, while tthe first lamina is formed in contact with a carrying and first contiguous surface, the succeeding lamina or laminae are all formed between a contiguous converging surface and an outside surface of a previous lamina or laminae adherent to a carrying surface. At the first and at each succeeding nip, each bank of thermoplastic material is maintained at a temperature above its melting or softening point and at each nip except the first, the temperature of each succeeding material is preferably maintained above the melting or softening point of the material comprising the previously formed layer with which it is in immediate contact so that, as applied, the heat will cause a fusion of both materials. It is preferable in order to obtain maximum fusing of adjacent layers and to obtain maximum thermostability in physical properties to operate the carrying surface at as high a temperature as is consistent with adequate surface viscosity and with clean stripping of the laminate from the carrying surface.

After the desired number of layers have been fused together, the resultant sheet has physical characteristics such that it may be stripped from the carrying surface (as a self-supporting unit) and wound upon a take-up roll.

Laminations of this invention may be transparent, translucent or opaque, either as a whole or with respect to any of the laminae. Such laminations may be practically produced commercially in film-form of uniform thickness having calipers ranging as low as ½ mil.

The above and other conditions of operation may be better understood in connection with the description of the accompanying drawings which illustrate diagrammatically various forms of apparatus which may be utilized in carrying out the methods of this invention to produce products hereof, and wherein.

Figures 1, 2:
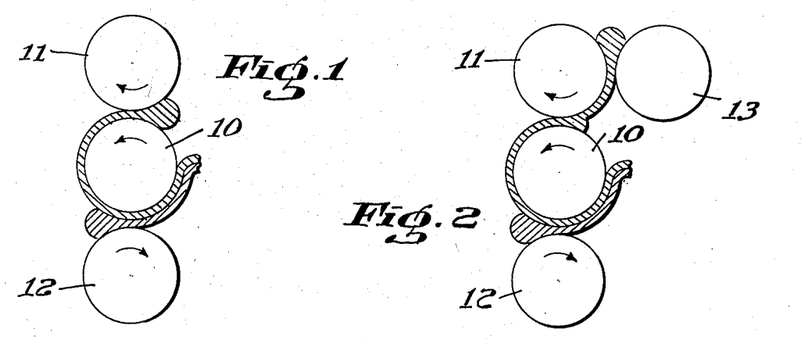
Fig. 1 is a diagrammatic view in elevation of a three-roll calendar useful for making two-lamina products by the process of this invention.
Fig. 2 is a view similar to Fig. 1 with the addition of a metering roll.

Fig. 1 illustrates a series of forming surfaces comprising rolls mounted for rotation about vertically aligned horizontal axes. In this instance, the middle roll 10 operates as the carrying surface, whereas the top roll 11 and the bottom roll 12 operate as successive contiguous converging surfaces forming nips with the roll 10. A thermoplastic material which may comprise a blend of ingredients previously mixed on a plasticator such as a Banbury mixer, an extruder or on an ordinary rubber mill, may be deposited in molten condition at the upper nip between rolls 10 and 11 so that it forms a bank of material, as shown. In order to keep the bank in molten condition, the surface of the upper roll is preferably maintained at a temperature above the melting or softening point of the deposited material but obviously this molten condition may be preserved by other means.

The relative conditions of speed and temperature of the rolls 10 and 11 and their relative spacing at the gap is such that a continuous layer of thermoplastic material emerges from the nip adherent to the middle roll 10. This result may be accomplished initially regardless of the temperature, within practical limits, of the carrying surface 10, by stopping the contiguous roll 11.

Although entirely satisfactory and for some purposes perhaps the most satisfactory films may be obtained with stopped contiguous surfaces it is generally desirable, in order to promote manufacturing efficiency and make possible production of films having more widely varied physical properties, to operate with moving contiguous surfaces.

Where both carrying surface and contiguous surfaces are moving, however, there is a general tendency for an emerging layer of thermoplastic material to adhere to the warmer surface. When the contiguous surface is the warmer surface this tendency may be substantially overcome by changing the relative speeds of the surfaces either by speeding up the carrying surface or slowing down the contiguous surface until the proper adherence to the carrying surface is obtained. A matte exposed surface is obtained under such circumstances and a thin layer of material may pull away from this matte surface adherent to the contiguous roll.

In some cases the temperature of the carrying surface at the point of pull-off may preferably be maintained at a temperature below the melting or softening point of the immediately adherent lamina in order to accomplish clean stripping. In other cases, one of the laminae may serve to make the laminate self-supporting and cleanly strippable from the carrying surface even though the lamina adherent to the carrying surface may be molten. Otherwise unstrippable laminates may be made satisfactorily strippable by incorporating more heat resistant materials such as fibers, threads, mats and meshes into or between the laminae.

In still other cases the melt viscosities and/or cohesive strengths of some laminae immediately adherent to the carrying surface are sufficiently high to permit stripping them from the carrying surface when the temperature of the latter is above the melting or softening point of such laminae. In general, where above melting or softening point temperatures of the carrying surface are possible, better lamina bonding is obtained by operating the contiguous roll or rolls at temperatures approaching or above that of the carrying surface. Under such operating conditions, and in fact generally, it is usually preferable to control the viscosity of the exposed lamina so that it will be as great or greater than that of the bank of material from which the next lamina is to be drawn.

When operating with a carrying surface at temperatures sufficiently higher than those of the contiguous rolls, it is possible to operate the latter at surface speeds slightly in excess of the speed of the carrying surface but generally I prefer to operate the contiguous rolls at the same or slower speeds than the carrying surface under such circumstances.

Assuming that the middle roll 10 is maintained at a temperature below the melting or softening point of the first thermoplastic layer to be formed as the base lamina of a two-layer laminate and that the upper contiguous roll 11 is maintained at a temperature above the melting or softening point of this layer, the material may be caused to adhere as it emerges from the nip to the middle roll 10 by stopping roll 11 or by operating it at a sufficiently lower differential speed. The material adherent to roll 10 will be carried thereby through the second or lower nip gap (which, of course, is greater than the adherent film thickness). A bank of the same or of a different similarly previously blended thermoplastic material is deposited in molten condition at the second nip between the bottom roll surface 12 and the outer surface of the formed layer of material carried by the middle roll 10. If a metering roll is utilized to furnish material to this nip it is essential that at least a small rolling bank of such material be maintained at the nip since otherwise sufficient pressure for best bonding will be lacking.

The lower gap width is adjusted so that it will yield the desired thickness of layers in the final product.

As in the case of the upper nip, in order to conveniently maintain the material introduced at the lower nip in molten condition, the surface of the bottom roll may be maintained at a temperature above the melting or softening point temperature of the second thermoplastic material and preferably above the melting or softening point of the previously formed thermoplastic material, in which case roll 12 should not rotate at so great a speed as roll 10. A highly desirable fusing action under pressure is then accomplished at the lower nip at the interface between the two materials, since at the time of formation and application of the second layer its heat will tend to melt or soften the contacting surface of the first layer. In this connection where the viscosity of the molten layer being applied may otherwise be appreciably greater than the viscosity of the underlaying contacting layer, the viscosity of the latter may be controlled by lowering the temperature of the carrying surface to the point where extrusion of the underlying layer is inconsequential.

The operations previously described may be carried out by use of various other apparatus.

Fig. 2 illustrates the addition of a metering roll 13 to the apparatus of Fig. 1. In this case, the metering roll is used for the purpose of aiding the maintenance of a continuous feed of the material to the nip between the carrying and contiguous rolls. For this purpose the roll 13 preferably may be maintained at somewhat greater temperatures than roll 11 but rotated at lesser speeds. If other operating conditions are desired for mechanical convenience or other reasons the principles of relative temperatures and surface speeds set forth heretofore should be applied.

Figure 3:
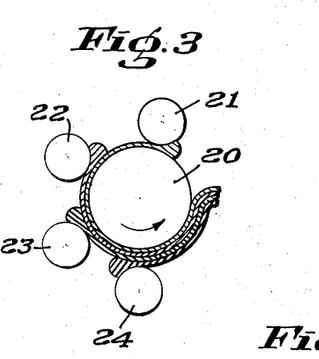
Fig. 3 is a diagrammatic view in elevation of a type of calender useful in making multi-lamina products by the process of this invention.

Fig. 3 illustrates an apparatus for the formation of products having two or more laminae. In this instance, there are shown four contiguous surfaces forming four nips to produce a four lamina product. The operation may be the same as that heretofore disclosed.

It will be understood that in Fig. 3, the roll 20, corresponds to the carrying surface 10 in Fig. 1, the roll 21 corresponds to the roll 11 of Fig. 1 and the roll 22 corresponds to the roll 12 of Fig. 1, the rolls 22 and 23 being added rolls, similar to roll 12, to form additional nips.

Figure 4:
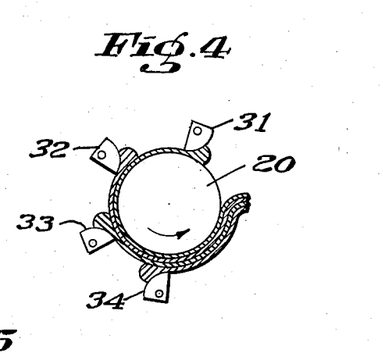
Fig. 4 is a similar view of a modification of the apparatus of Fig. 3.

Fig. 4 shows an apparatus similar to Fig. 3, except that the contiguous surfaces 31 and 32, 33 and 34 are always stationary during operation and take the form of eccentrically-mounted cylindrical segments which, by adjustment can be made to vary the width of the nip gaps.

Figure 5:
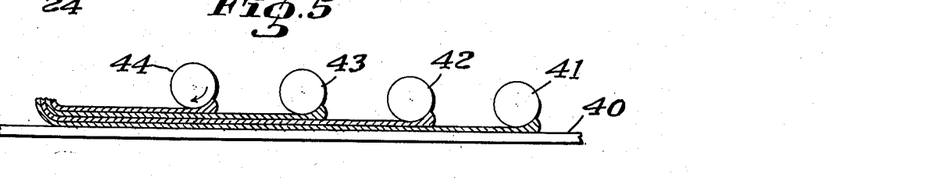
Fig. 5 is a diagrammatic view in elevation of another type of apparatus useful in making multi-lamina products by the process of this invention.
Figure 6:
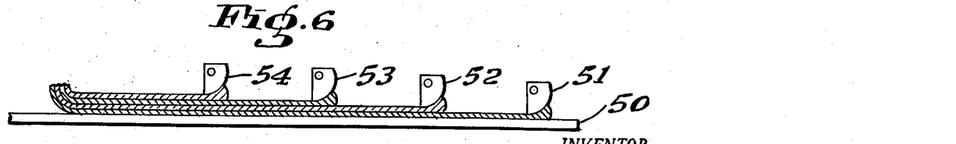
Fig. 6 is a similar view of a modification of the apparatus of Fig 5.

Fig. 5 and Fig. 6 show apparatus similar to that of Figs. 3 and 4, except, in effect, the carrying surface 20 has been developed into a straight conveyor-type of carrying surface. In these figures, the carrying surface is indicated by the references 40 and 50 respectively, and the contiguous surfaces in roll form in Fig. 4 at 41, 42, 43, and 44, and in stationary adjustable form in Fig. 5 at 51, 52, 53 and 54.

Figure 7:
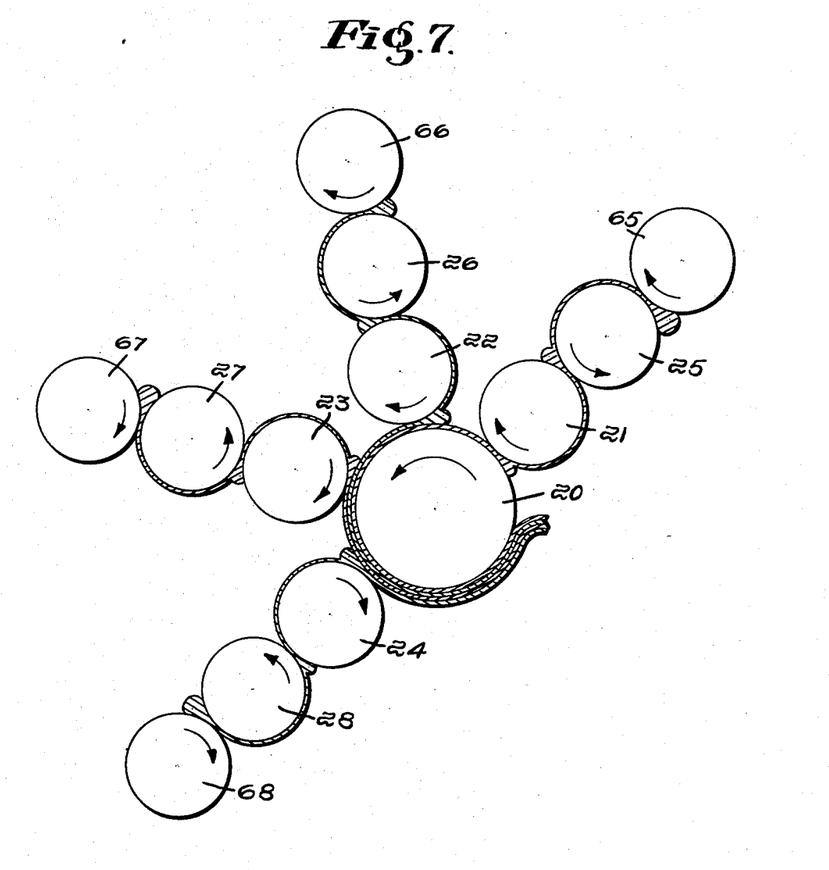
Fig. 7 is a similar view of a modification of the apparatus of Fig. 3.

Fig. 7 illustrates the addition of metering rolls 65, 66, 67 and 68 and working rolls 25, 26, 27 and 28 to the apparatus of Fig. 3. Preferably these rolls progressively increase in temperature in any particular associated group from metering roll to working roll to contiguous roll so that transfer of thermoplastic material may be accomplished while these rolls are moving at the same speed. At each of the three nips, including the nip between roll 20 and the respective contiguous roll, a bank of thermoplastic material is shown indicating that at each nip the material is reformed until it is finally deposited in a layer either on the carrying surface or upon the exposed surface of layered material adherent to the carrying surface.

Specific examples employing the principles set forth heretofore are as follows:

EXAMPLE 1

The method of this invention is highly useful in the production of laminates which include a mixture of 85% polyethylene–15% polyisobutylene as the first material and a pressure-sensitive adhesive as the second. The polyethylene and polyisobutylene are first blended on a rubber mill at a temperature of approximately 340° F. until homogeneous and molten. The melting or softening point of the blend is about 235° F.

The material to be introduced at the second nip, a conventional rubber resin pressure-sensitive adhesive, is prepared on a rubber mill in the usual well-known manner at 300° F.

In order to form these two materials into a 2-mil laminate in accordance with this invention, the top nip is adjusted to yield a thickness of 1 mil and the bottom nip is adjusted to yield a thickness of 2 mils.

The surface temperature of the middle roll is maintained at 190° F., that of the upper roll 11 at 340° F. and that of the bottom roll 12 at 340° F. The middle roll is rotated at a surface speed of about 3 yards per minute. At the beginning of the operation, the rolls 11 and 12 are not rotated. The molten polyethylene mixture at a temperature of about 340° F. is placed in the top nip. A sheet of the material is formed at the nip and carried therethrough adherent to the roll 10. The adherent film is pulled free after it has passed beyond the second nip, at which point it may be continuously stripped from the middle roll. After this sheet is being successfully formed and the drawn off the center roll in proper thickness, the molten adhesive (300° F.) is introduced at the second nip and rolled as a bank between the layer of polyethenoid material and the surface of the bottom roll. The layer of adhesive formed at the lower nip is adherent as it emerges from the lower nip, to the polyethenoid layer. The composite is stripped from roll 10 as a self-supporting laminate. At this point the surface speed of the middle roll 10 is increased to 20 yards per minute and immediately thereafter, the speed of the contiguous rolls is brought up to about 3 yards per minute.

The laminate so made exhibits particularly fine interface adherence because of the fusion of the two materials by the temperature and pressure applied at the lower nip.

Variations of Example I in which the material of the initial film was varied from 100% polyethylene to 50-50 mixtures of polyethylene and high molecular weight polyisobutylene and in which a wide range of pressure-sensitive adhesives were used as the second lamina were also produced. In producing these variations by the apparatus of Fig. 1, the top and bottom roll temperatures were varied from 250° F. to 350° F. while the middle roll temperature was varied from 120° F. to 210° F. These temperature ranges were chosen, however, because of the melting or softening points of the materials utilized. The ranges are wider where materials are utilized having melting or softening points of different order of magnitude from those of the above materials.

For instance one may utilize the method of the invention with thermoplastic materials of the highest melting or softening points, there being no apparent upper limit with regard to softening or melting points so long as the materials are still thermoplastic. It is obvious, of course, that special precautions should be taken where the materials to be laminated together have widely separated melting or softening points. For instance, if the temperature of a material is to be raised considerably above its melting or softening point, it is desirable to make the exposure to such temperature as short as possible. In some cases it may be helpful to blanket the lower melting or softening material during its exposure to processing with nitrogen, particularly if oxygen promotes degradation in the given material at the temperatures involved. In such cases a small bank at the fusion nip is preferable to a larger bank. In order to shorten the period of exposure to a minimum it may be desirable, where the lower melting or softening point material is one of the outside laminae, to place it on the carrying surface as the initial layer. Lowering the carrying surface temperature would then confine to a minimum thickness consistent with layer fusion, the amount of lower melting or softening point material subjected to the higher melting or softening point material temperature. It is also possible to further decrease the effect of high melting or softening temperatures by increasing the speed of the carrying surface, by operating with a minimum rolling bank of the higher melting or softening material, by reducing the thickness of the higher melting or softening point material in a laminate and by increasing the thickness of the lower melting or softening layer in a laminate.

Where the materials to be fused have melting or softening points in the same general range they may generally be laminated without any special precautions.

I have found that the methods of this invention are of particular utility in uniting laminae of similar or wholly dissimilar materials to the general class of waxy ethenoid polymers having compositions corresponding to the empirical formula:

Where $R_1$ and $R_4$ are, independently, hydrogen or an alkyl group, $R_2$, $R_3$, $R_4$, $R_5$ and $R_6$ are, independently, monovalent radicals such as hydrogen, alkyl, phenyl, or substituted phenyl, or vinyl or substituted vinyl and the ratio $x:y$, where $R_1$, $R_2$ and $R_3$ are hydrogen exceeds 1:5 and is preferably greater than 1:1 and preferably exhibiting crystalline structure by X-ray diffraction analysis, and having melting or softening points greater than 212° F. and preferably in the range of 212° F. to 350° F. (A.S.T.M. D569–48). Solid polymers and interpolymers of this type are described in United States Patent No. 2,153,553 and British Patent No. 497,643 the homopolymer being polyethylene.

The proper temperature conditions for pressure fusing two or more laminae to yield the laminates of this invention are such that at the moment of applying pressure substantially the entire outermost layer and at least the adjacent surface of the underneath layer being fused are at such temperatures that each is above its effective softening point and both are capable of viscous flow and/or deformation under the conditions. Generally this physical condition occurs with crystalline materials when the highest effective melting point temperature is reached and both layers become amorphous. The effective melting points may be closely approximated by determinations made in accordance with A.S.T.M. designation D569–48.

When the expression "melting point" is used, therefore, in this application it embraces both the classical melting point of crystalline thermoplastics and the thermal softening range of non-crystalline thermoplastics. In other words, the expression "melting point" when used in connection with a thermoplastic material means that temperature above which the material exhibits the viscous flow characteristics necessary in the process of this invention.

The methods of this invention have much wider application than the uniting of laminae of polyethenoid materials to other laminae, however, and may be utilized successfully in securing better laminations of any two or more thermoplastic film-forming materials.

For instance among classes of thermoplastics which are of particular interest and applicability, the polyesters such as polyethylene terephthalate, polytetramethylene adipate, as well as polyesters derived from 1,4-bis(hydroxymethyl)benzene and sebacic acid and the like; polyamides such as polyhexamethylene adipamide, poly-m-phenylene phthalamide as well as nylon type copolymers such as those derived from sebacic and adipic acids with hexamethylene diamine, and the like; polyurethanes such as the products of ethylene and polyethylene glycols and toluene diisocyanate or other diisocyanates, and the lke; polyhydrocarbons and their derivatives in addition to those covered by the above empirical formula such as chlorosulfonated polyethylene, poly-p-xylylene or suitable copolymers thereof, polytetrafluoroethylene, polychlorotrifluoroethylene, polyvinylidene chloride, polyisoprene, polybutadiene, polychloroprenes, polystyrene and the like; polyacrylates such as polybutylacrylate, polyacrylonitrile, polypropyl-alpha-chloroacrylate and the like; polyalcohols and derivatives such as polyvinyl alcohol, polyvinyl acetate, and the like; silicones; polyethers such as polyethylene oxide; polyamines such as polyvinyl pyridines and the like; and copolymers, interpolymers and block copolymers of the above mentioned materials as well as other types are operable.

In the foregoing paragraph particular attention should be directed to poly-p-xylylene with a melting point of 715° F., to polytetrafluoroethylene with a melting point of 620° F., and to polyhexamethylene adipamide with a melting point of 482° F. These thermoplastics of high melting or softening point illustrate particularly well the wide applicability and utility of my inventive process for laminating materials of differing melting or softening points and constitution.

EXAMPLE 2

The bulk blend for a base lamina was prepared on the mill at 340° F. from pure polyethylene chips. On another mill a 50-50 mixture of polyethylene and high molecular weight (100,000) polyisobutylene was prepared on the mill also at 340° F. These two laminae were placed upon the calender as in Example 1 to produce an inseparable laminate of polyethylene on one side and 50-50 mixture on the other.

EXAMPLE 3

A colloidal mixture of polymers comprising 45% butadiene-acrylonitrile polymer and 55% polyvinyl chloride sold by B. F. Goodrich, Rose Building, Cleveland 15, Ohio, under the name Geon Polyblend 500 x 503 was prepared on a rubber mill at 340° F. On another mill a pressure-sensitive adhesive of the rubber-resin type having an elastomer ratio of two parts butadiene-acrylonitrile elastomer to one part pale crepe rubber was prepared at 340° F. utilizing well-known adhesive preparation methods. These two laminae were placed upon the calender as in Example 1, with the center roll at 240° F., the Geon Polyblend being the base film. An excellently anchored pressure-sensitive tape resulted.

EXAMPLES 4 to 29

Examples 4 to 29 were prepared on a multi-roll calender on which the contiguous rolls were all maintained at 340° F. while the center roll was maintained at 190° F. These temperatures were kept constant in order to expedite the production of a variety of laminates, 340° F. being above the melting point of any lamina utilized in their preparation. In all cases the lamina materials were milled on a rubber mill at 340° F. until the plastic component was completely melted and until they were homogeneous.

The examples in this group were divided according to the base films into three tables. In each table the base film and the other laminae are represented by code letters. The examples are indicated horizontally, the base film being immediately to the right of the example number, the number 2 indicating the next lamina, 3 the next, etc.

In the tables letter A indicates an internally plasticized vinyl chloride copolymer sold under the name COR-1 Polymer by Bakelite Corporation, 30 East 42nd Street, New York 17, N.Y.

Letter B indicates a mixture of polymers colloidally dispersed comprising 45% butadiene-acrylonitrile polymer and 55% polyvinyl chloride sold under the name Geon Polyblend 500 x 503, by B. F. Goodrich Chemical Co., Rose Building, Cleveland 15, Ohio.

Letter C indicates a chlorinated polyethylene having a chlorine content of 30–35% by weight and sold under the name Hypalon C-1 by E. I. du Pont de Nemours & Company, Wilmington 98, Delaware.

Letter D indicates a mixture of 85% polyethylene (sold under the name DYNH Polyethylene by Bakelite Corporation having a molecular weight of about 21,000 and a melting point of 110° C.) and 15% high molecular weight polyisobutylene sold under the name Vistanex B-100 by Enjay Company, Inc., 15 West 51st Street, New York 19, N.Y.

Letter E indicates a low melt (276° F.) polyamide sold under the name Type 6 Nylon Molding Powder by E. I. du Pont de Nemours.

Letter F indicates a higher styrene, styrene-isobutylene copolymer, an example of which is disclosed in U.S. Patent No. 2,274,749. The particular material used has a melting point of 150° F. and is sold under the name Polymer S-60 by Enjay Company, Inc.

Letter G indicates a chlorosulfonated polyethylene (approximately 27.5% chlorine and 1.5% sulfur by weight with most of the chlorine substituted on the hydrocarbon chain and the sulfur being present in sulfonyl chloride groups) sold under the name Hypalon S-2 by E. I. du Pont de Nemours.

Letter H indicates a 50-50 butylmethacrylate-isobutylmethacrylate interpolymer having a melting point of approximately 250° F. sold under the name Hypalon 6 by E. I. du Pont de Nemours.

Letter I indicates a mixture of 40% polyethylene and 60% polyisobutylene of the types described under letter D.

TABLE I

| Example No. | Base Film | Laminae | | | | | | |
|---|---|---|---|---|---|---|---|---|
| | | B | C | D | E | F | G | H |
| 4 | A | 2 | 3 | | | | | |
| 5 | A | 2 | | 3 | | | | |
| 6 | A | 2 | | | 3 | | | |
| 7 | A | 2 | | | | 3 | | |
| 8 | A | 2 | | | | | 3 | |
| 9 | A | 2 | | | | | | 3 |
| 10 | A | | 2 | 3 | | | | |
| 11 | A | 3 | 2 | | | | | |
| 12 | A | | 2 | | | 3 | | |
| 13 | A | | 2 | | | | 3 | |
| 14 | A | | 2 | | | | | 3 |
| 15 | A | | 3 | | | | 2 | |

TABLE II

| Example No. | Base Film | Laminae | | | | | | |
|---|---|---|---|---|---|---|---|---|
| | | I | A | B | C | E | F | G | H |
| 16 | D | 2 | 3 | | | | | | |
| 17 | D | 2 | | 3 | | | | | |
| 18 | D | 2 | | | 3 | | | | |
| 19 | D | 2 | | | | 3 | | | |
| 20 | D | 2 | | | | | 3 | | |
| 21 | D | 2 | | | | | | 3 | |
| 22 | D | 2 | | | | | | | 3 |
| 23 | D | | | 2 | 3 | | | | |
| 24 | D | | | | 3 | | 2 | | |
| 25 | D | | | | 3 | | | 2 | |
| 26 | D | | 2 | | 3 | | | | |

TABLE III

| Example No. | Base Film | Laminae | | | | | |
|---|---|---|---|---|---|---|---|
| | | A | C | G | I | D | F |
| 27 | B | 2 | 3 | 4 | 5 | 6 | 7 |
| 28 | B | 2 | 4 | 3 | | | |
| 29 | B | 2 | 3 | 4 | | | |

Examples of the method of producing laminates including higher melt materials are as follows:

EXAMPLE 30

Using apparatus similar to that illustrated diagrammatically in Figure 5 but with only two rolls 41 and 42 and these stationary and with roll 41 at a temperature of 490° F., roll 42 at a temperature of 610° F. and with carrying surface 40 at a temperature of 200° F., a laminate of polychlorotrifluoroethylene and a polyamide derived from omega-amino-caproic acid was produced as follows:

A molten bulk of the polyamide at a temperature of about 500° F. was placed at the nip between stationary roll 41 and the carrying surface 40. The nip was adjusted to yield a 10 mil film adherent to the carrying surface as it moved at about 3 yards per minute in the direction indicated in Fig. 5. A molten bulk of the polychlorotrifluoroethylene at a temperature of about 610° F. was then placed between the polyamide film and the stationary roll 42 whereupon the roll was adjusted to yield a laminate of about 20 mils thickness which displayed considerable adhesion at the fused interface.

EXAMPLE 31

Using the apparatus of Example 30 but with stationary roll 41 at a temperature of 490° F., stationary roll 42 at a temperature of 550° F. and carrying surface 40 at a temperature of 175° F., a fused laminate of the polyamide used in Example 30 and polyethylene terephthalate was produced as follows:

A molten bulk of the polyamide at a temperature of about 500° F. was placed at the nip between stationary roll 41 and carrying surface 40. A 10 mil film of the polyamide adherent to the moving carrying surface was formed as in Example 30. A molten bulk of polyethylene terephthalate at a temperature of about 550° F. was then placed at the nip between stationary roll 42 and the polyamide film. Thereafter the nip was adjusted to yield upon removal from the carrying surface a strongly fused laminate of the polyamide and polyethylene terephthalate of about 20 mils thickness.

EXAMPLE 32

Using the apparatus of Example 30 but with stationary roll 41 at a temperature of about 500° F., stationary roll 42 at a temperature of about 625° F. and carrying surface 40 at a temperature of about 175° F. a fused laminate of polyethylene terephthalate and polyhexamethylene adipamide was produced as follows:

A molten bulk of polyethylene terephthalate at a temperature of about 500° F. was placed at the nip between stationary roll 41 and carrying surface 40. A 10 mil film of polyethylene terephthalate adherent to carrying surface 40 was thus produced. Thereafter a molten bulk of polyhexamethylene adipamide at a temperature of about 550° F. was placed at the nip between stationary roll 42 and the polyethylene terephthalate film on the carrying surface. The nip was adjusted to yield a 20 mil fused laminate of polyethylene terephthalate and polyhexamethylene adipamide which when removed displayed a well fused interface.

EXAMPLE 33

Using the apparatus of Example 30 but with stationary roll 41 at a temperature of about 625° F., stationary roll 41 at a temperature of about 500° F., and carrying surface 40 at a temperature of about 200° F., a laminate of polychlorotrifluoroethylene and polyethylene terephthalate was produced as follows:

A molten bulk of polychlorotrifluoroethylene at a temperature of about 625° F. was placed at the nip between stationary roll 41 and carrying surface 40. The nip was adjusted to yield a film of polychlorotrifluoroethylene adherent to carrying surface 40. Local heat was applied to the adherent film to maintain its exposed surface at about 625° F. in its travel between stationary rolls 41 and 42. A molten bulk of polyethylene terephthalate at about 500° F. was then placed at the nip between stationary roll 42 and the polychlorotrifluoroethylene film on the carrying surface. The nip was adjusted to yield a 20 mil fused laminate of polyethylene terephthalate and polychlorotrifluoroethylene which exhibited very strong bonding at the fused interface.

EXAMPLE 34

Using the apparatus of Example 30 but with stationary roll 41 at a temperature of about 550° F., stationary roll 42 at a temperature of about 450° F. and carrying surface 40 at a temperature of about 200° F., a laminate of polyhexamethylene adipamide and a high density polyethylene was prepared as follows:

A molten bulk of polyhexamethylene adipamide at a temperature of about 550° F. was placed at the nip between stationary roll 41 and carrying surface 40. A 15 mil film adherent to carrying surface 40 was thus produced by movement of the carrying surface. Thereafter a molten bulk of high density polyethylene was placed at the nip between stationary roll 42 and the polyhexamethylene adipamide film adherent to the carrying surface. The nip was adjusted to yield a 30 mil fused laminate of high density polyethylene and polyhexamethylene. When removed, the laminate demonstrated a well adhered fused structure.

EXAMPLE 35

Using the apparatus of Example 30 but with stationary roll 41 at a temperature of 450° F., stationary roll 42 at a temperature of 450° F., and carrying surface 40 at a temperature of about 175° F., a fused laminate of a high density polyethylene and unplasticized polyvinyl chloride was produced as follows:

A molten bulk of high density polyethylene at a temperature of about 450° F. was applied to the nip between stationary roll 41 and carrying surface 40. The nip was adjusted to yield a 10 mil polyethylene film adherent to the carrying surface. Thereafter a molten bulk of polyvinyl chloride at a temperature of about 450° F. was applied to the nip between stationary roll 42 and the polyethylene film adherent to the carrying surface. The nip was adjusted to yield a 20 mil fused laminate which when removed proved to be a well fused structure.

As an example of a laminate made under conditions such that the carrying surface at the point of pull-off is at a temperature above the melting point of the immediately contacting lamina, the following is given:

EXAMPLE 36

*Back film*

A mixture of:

| | Parts by weight |
|---|---|
| Vinyl chloride polymer | 70 |
| Oil-modified polyester of sebacic acid and other sebacic acids | 30 |
| Dibasic lead phosphite | 2 to 5 |
| Lead stearate | .2 to .5 |
| Pigmenting carbon block | 1 to 2 |

This base film, milled to a uniform consistency on a rubber mill at 340° F., was placed between the nip of a metering roll and the first contiguous roll on a multiple roll calender of the general type of Fig. 3, but having a metering roll contacting the initial contiguous roll. Temperatures as follows were utilized:

| | Degrees Fahrenheit |
|---|---|
| Metering roll | 300–330 |
| First contiguous roll | 310–340 |
| Carrying surface | 320–350 |

Preferably each successive roll temperature should be slightly higher than the adjacent preceding roll to effect convenient transfer of the film. The nip gaps between the rolls were adjusted to produce a base film of the desired thickness (in this case 5 mils) with a small rolling bank at the final forming nip. When this base film was being freely pulled off in the proper thickness, a molten mass of the following primer material for an intermediate lamina was placed between the nip of the second contiguous roll and its metering roll with their temperatures being respectively 300° F.–330° F., and 290° F.–320° F.:

Intermediate lamina

| | Parts by weight |
|---|---|
| Butadiene-acrylonitrile elastomer | 60 |
| Polyvinyl chloride | 40 |
| Dibasic lead phosphite | 1 to 3 |
| Lead stearate | .1 to .3 |
| Symmetrical di - beta - naphthol-p-phenylene diamine | .5 to 2 |
| Microcrystalline wax or synthetic wax | .1 to .5 |
| Pigmenting carbon black | 1 to 2 |

The nip was adjusted to yield a composite of 5½ mils thickness.

Final lamina

Between the nip of the carrying surface and the third contiguous roll (at 300° F.–340° F.), and contacting the intermediate lamina, was placed a molten adhesive mixture constituting the final lamina:

| | Parts by weight |
|---|---|
| Butadiene-acrylonitrile | 50 |
| Pale crepe rubber | 17 |
| Hydrogenated rosin ester | 33 |
| Symmetrical di - bcta - naphthol-p-phenylene-diamine | 1 to 3 |
| Microcrystalline wax or synthetic wax | .5 to 1 |
| Pigmenting carbon black | 1 to 2 |

The nip was adjusted to yield a final composite of 7 mils. This composite pulled off cleanly from the carrying surface and was rolled up as a pressure-sensitive vinyl chloride-backed adhesive tape.

The operations described in this example may be carried out by the use of various other apparatus but in general vinyl compounds such as polyvinyl chloride and/or vinyl chloride copolymers and interpolymers to the extent of from 50–80% of the base film weight plasticized with polymeric elastomeric and partial monomeric plasticizers in amounts from 20–50% thereof where the monomeric portion is of sufficiently low percentage as to avoid plasticizer migration, and modified by pigments and stabilizers, may be used as base films with the carrying surface at temperatures somewhat above the melting point of the base film.

It is preferable with vinyl compounds and with other compounds where difficulty of anchoring is normally encountered to use an intermediate compound between such hard-to-laminate materials and the next lamina. This intermediate lamina may generally be formed of mixtures of the materials of the two adjacent laminae. For many purposes I find approximately 50–50 percentages to be advantageous.

It is to be understood that all of the above examples are merely illustrative and that any two or more thermoplastic materials may be united by the process of this invention. In fact, low melt metals may be satisfactorily united to plastics by this method as may metals to other metals, the limitation being that materials to be laminated must be capable of temporarily withstanding the fusion temperature of the higher melt materials without destruction. The degree of anchorage obtained is in part a function of the mutual solubility of the adjacent materials at the temperature at which they are fused.

The laminates made by the methods of this invention may be made as slowly as three yards per minute or they may be made at the highest speed of which the moving surface is capable subject to the viscosity effects of the material under the conditions of operation. I find that at speeds of twenty yards per minute excellent quality laminates can be produced.

Generally the laminates made by the methods of this invention may be removed from the carrying surface without difficulty but with thermoplastics which demonstrate some tendency to resist removal to the point of causing difficulty, it may be advantageous to coat the carrying surface with any of the well known parting agents for thermoplastic materials, it being understood that some adhesion to the carrying surface is to be retained.

Whenever rolls are utilized as contiguous surfaces, either on calenders or otherwise, it may be desirable to use other devices than metering rolls in conjunction with one or more contiguous rolls for maintaining the rotating molten bank at the nip as a desirably small smooth rolling cylinder. Such devices as extruders which perform the same function may be utilized as substitutes for metering rolls. Extruders or other devices may also obviously be utilized as metering devices with suitable types of apparatus such as those illustrated in Fig. 4 and Fig. 6. In the absence of such devices, the nip may be fed by the customary manual techniques used in calendering.

This application is a continuation-in-part of my copending application Serial No. 341,714, filed March 11, 1953, now abandoned.

I claim:

1. The method for the manufacture of a flexible self-supporting laminar sheet comprising depositing a molten bulk of organic thermoplastic material at a nip between a moving carrying surface and a first converging surface to form a layer of said material as it emerges from said nip adherent to the carrying surface, carrying said layer while it is still adherent to said carrying surface into contact with a molten bulk of a second chemically different organic thermoplastic material, deposited directly between the adherent layer and a second converging surface forming a second nip with said moving carrying surface, one of said thermoplastic materials being a pressure-sensitive adhesive, and carrying said two materials through said second nip while maintaining each material at the interface between them at a temperature above its melting point to form adherent to said carrying surface a laminated sheet of materials and thereafter stripping said laminated sheet as a continuous sheet from said carrying surface.

2. The method for the manufacture of a flexible self-supporting laminar sheet comprising depositing a molten bulk of organic thermoplastic material at a nip between a moving carrying surface and a first converging surface to form a layer of said material as it emerges from said nip adherent to the carrying surface, carrying said layer while it is still adherent to said carrying surface into contact with a molten bulk of a second chemically different organic thermoplastic material, deposited directly between the adherent layer and a second converging surface forming a second nip with said moving carrying surface, and carrying said two materials through said second nip while maintaining each material at the interface between them at a temperature above its melting point to form a laminated sheet of materials.

3. The method for the manufacture of a flexible self-supporting laminar sheet comprising depositing a molten bulk of organic thermoplastic material at a nip between a moving carrying surface and a first converging surface to form a layer of said material as it emerges from said nip adherent to the carrying surface, carrying said layer while it is still adherent to said carrying surface into contact with a molten bulk of a second chemically different organic thermoplastic material, deposited directly between the adherent layer and a second converging surface forming a second nip with said moving carrying surface, one of said thermoplastic materials having a melting point in the range of 150°–715° F., and the other of said thermoplastic materials being a pressure-sensitive adhesive, and carrying said two materials through said second nip while maintaining each material at the interface between them at a temperature above its melting point to form adherent to said carrying surface a laminated sheet of materials and thereafter stripping said laminated sheet as a continuous sheet from said carrying surface.

4. The method for the manufacture of a flexible self-supporting laminar sheet comprising depositing a molten bulk of organic material at a nip between a moving carrying surface and a first converging surface to form a layer of said material as it emerges from said nip adherent to the carrying surface, carrying said layer while it is still adherent to said carrying surface into contact with a molten bulk of a second chemically different organic thermoplastic material, deposited directly between the adherent layer and a second converging surface forming a second nip with said moving carrying surface, each of said thermoplastic materials having a melting point in the range of 150°–715° F., and carrying said two materials through said second nip while maintaining each material at the interface between them at a temperature above its melting point to form a laminated sheet of materials.

5. The method for the manufacture of a self-supporting laminar sheet comprising depositing a molten bulk of thermoplastic material at a nip between a moving carrying surface and a first converging surface to form a layer of said material as it emerges from said nip adherent to the carrying surface, carrying said layer while it is still adherent to said carrying surface into contact with a molten bulk of a second chemically different thermoplastic material, deposited directly between the adherent layer and a second converging surface forming a second nip with said moving carrying surface, one of said thermoplastic materials having a melting point in the range of 150°–350° F., and the other of said thermoplastic materials being a pressure-sensitive adhesive said second chemically different material being maintained at second nip at a temperature above the melting point of both of said materials, and carrying said two materials through said second nip while maintaining said materials at the interface between them at a temperature above their melting points to form adherent to said carrying surface a laminated sheet of materials and thereafter stripping said laminated sheet as a continuous sheet from said carrying surface.

6. The method for the manufacture of a self-supporting laminar sheet comprising depositing a molten bulk of thermoplastic material at a nip between a moving carrying surface and a first converging surface to form a layer of said material as it emerges from said nip adherent to the carrying surface, carrying said layer while it is still adherent to said carrying surface into contact with a molten bulk of a second chemically different thermoplastic material, deposited directly between the adherent layer and a second converging surface forming a second nip with said moving carrying surface, each of said thermoplastic materials having a melting point in the range of 150°–350° F., said second chemically different material being maintained at said second nip at a temperature above the melting point of both of said materials, and carrying said two materials through said second nip while maintaining said materials at the interface between them at a temperature above their melting points to form adherent to said carrying surface a laminated sheet of materials and thereafter stripping said laminated sheet as a continuous sheet from said carrying surface.

7. The method in accordance with claim 5 wherein the thermoplastic material having a melting point in the range of 150°–350° F. comprises polyethylene.

8. The method in accordance with claim 5 wherein the first mentioned thermoplastic material has a melting point in the range of 150°–350° F. and wherein the carrying surface and the first converging surface have different temperatures and move relatively to each other at different surface speeds, the carrying surface having a temperature below the melting point of the material directly adhering to it and having a faster surface speed than the surface speed of the first converging surface.

9. The method in accordance with claim 6 wherein the carrying surface and the first converging surface have different temperatures and move relatively to each other at different surface speeds, the carrying surface having a temperature below the melting point of the material directly adhering to it and having a faster surface speed than the surface speed of the first converging surface.

10. The method in accordance with claim 5 wherein each of said three surfaces is a roll.

11. The method in accordance with claim 6 wherein each of said thermoplastic materials has a melting point in the range of 212°–350° F. and wherein each of said three surfaces is a roll.

12. The method in accordance with claim 5 wherein the first mentioned thermoplastic material has a melting point in the range of 150°–350° F. and wherein the carrying surface is a roll having a temperature below the melting point of said first mentioned thermoplastic material and said first and second converging surfaces are rolls having temperatures above the melting points of both of said thermoplastic materials.

13. The method as claimed in claim 5 wherein said laminated sheet, prior to stripping from said carrying surface, is carried into contact with a molten bulk of further thermoplastic material which forms a third lamina of said sheet.

14. The method as claimed in claim 6 wherein said laminated sheet, prior to stripping from said carrying surface, is carried into contact with a molten bulk of further thermoplastic pressure-sensitive adhesive material which forms a surface lamina of said sheet.

15. The method in accordance with claim 5 wherein the first mentioned thermoplastic material has a melting point in the range of 150°–350° F. and wherein the carrying surface has a temperature below the melting point of the material directly adhering to it and a faster surface speed than the surface speed of the first converging surface.

16. The method in accordance with claim 6 wherein the carrying surface has a temperature below the melting point of the material directly adhering to it and a faster surface speed than the surface speed of the first converging surface.

17. The method for the manufacture of a flexible self-supporting laminar sheet comprising depositing a molten bulk of organic thermoplastic material at a nip between a moving carrying surface and a first converging surface to form a layer of said material as it emerges from said nip adherent to the carrying surface, carrying said layer, while it is still adherent to said carrying surface and still at least partially molten, into contact with a molten bulk of a second chemically different organic thermoplastic material deposited directly between the adherent layer and a second converging surface forming a second nip with said moving carrying surface, one of said thermoplastic materials being a pressure-sensitive adhesive, and carrying said two materials through said second nip while maintaining each material at the interface between them at a temperature above its melting point to form adherent to said carrying surface a laminated sheet of materials and thereafter stripping said laminated sheet as a continuous sheet from said carrying surface.

18. The method for the manufacture of a flexible self-supporting laminar sheet comprising depositing a molten bulk or organic thermoplastic material at a nip between a moving carrying surface and a first converging surface to form a layer of said material as it emerges from said nip adherent to the carrying surface, carrying said layer, while it is still adherent to said carrying surface and still at least partially molten, into contact with a molten bulk of a second chemically different organic thermoplastic material, deposited directly between the adherent layer and a second converging surface forming a second nip with said moving carrying surface, and carrying said two materials through said second nip while maintaining each material at the interface between them at a temperature above its melting point to form a laminated sheet of materials.

19. The method for the manufacture of a flexible self-supporting laminar sheet comprising depositing a molten bulk of organic thermoplastic material at a nip between a moving carrying surface and a first converging surface to form a layer of said material as it emerges from said nip adherent to the carrying surface, carrying said layer, while it is still adherent to said carrying surface and its exposed surface is still molten, into contact with a molten bulk of a second chemically different organic thermoplastic material, deposited directly between the adherent layer and a second converging surface forming a second nip with said moving carrying surface, and carrying said two materials through said second nip while maintaining each material at the interface between them at a temperature above its melting point to form a laminated sheet of materials.

References Cited in the file of this patent
UNITED STATES PATENTS

| | | |
|---|---|---|
| 1,108,205 | Meyercord | Aug. 25, 1914 |
| 2,261,262 | Lewis | Nov. 4, 1941 |
| 2,586,275 | Toulmin | Feb. 19, 1952 |
| 2,631,954 | Bright | Mar. 17, 1953 |

UNITED STATES PATENT OFFICE

CERTIFICATE OF CORRECTION

Patent No. 2,879,547                                                              March 31, 1959

James F. Morris

It is hereby certified that error appears in the printed specification of the above numbered patent requiring correction and that the said Letters Patent should read as corrected below.

Column 13, line 3, after "organic" insert — thermoplastic —.

Signed and sealed this 11th day of August 1959.

(SEAL)
Attest:

KARL H. AXLINE
Attesting Officer

ROBERT C. WATSON
Commissioner of Patents